United States Patent
Hsu et al.

(10) Patent No.: US 7,505,375 B2
(45) Date of Patent: Mar. 17, 2009

(54) APPARATUS AND METHOD OF EJECTING AN OPTICAL DISC FOR AN OPTICAL DRIVE

(75) Inventors: Tsing-Sung Hsu, Taipei (TW); Yi-Cheng Tsao, Taipei (TW); Chun-Lung Ho, Taipei (TW)

(73) Assignee: Lite-On It Corporation, Taipei (TW)

( * ) Notice: Subject to any disclaimer, the term of this patent is extended or adjusted under 35 U.S.C. 154(b) by 834 days.

(21) Appl. No.: 11/062,803

(22) Filed: Feb. 23, 2005

(65) Prior Publication Data

US 2005/0201215 A1    Sep. 15, 2005

(30) Foreign Application Priority Data

Mar. 11, 2004   (TW) ............................... 93106555 A

(51) Int. Cl.
*G11B 7/085*    (2006.01)
(52) U.S. Cl. .................. 369/30.27; 369/30.36
(58) Field of Classification Search .............. 369/30.27, 369/30.36, 47.1, 30.18, 30.99, 30.93, 30.98
See application file for complete search history.

(56) References Cited

U.S. PATENT DOCUMENTS

| 7,266,053 | B2* | 9/2007 | Lee et al. | 369/30.36 |
| 2005/0013209 | A1* | 1/2005 | Hsu | 369/30.27 |
| 2005/0013210 | A1* | 1/2005 | Lee | 369/30.27 |
| 2005/0052959 | A1* | 3/2005 | Chang | 369/30.27 |

* cited by examiner

*Primary Examiner*—Marvin M Lateef
*Assistant Examiner*—Brenda Bernardi
(74) *Attorney, Agent, or Firm*—Bacon & Thomas, PLLC

(57) ABSTRACT

An apparatus and a method of ejecting an optical disc for an optical drive. First of all, a first voltage to a tray motor for moving a tray positioned at a first position inside the optical drive is provided. Next, a time required for moving the tray from a first position to a second position is measured, wherein the second position is positioned between the first position and a complete-ejection position. After that, a second voltage according to the time is determined. Lastly, the second voltage to the tray motor for moving the tray to the complete-ejection position is provided.

8 Claims, 3 Drawing Sheets

APPARATUS AND METHOD OF EJECTING AN OPTICAL DISC FOR AN OPTICAL DRIVE

This application claims the benefit of Taiwan application Serial No. 93106555, filed Mar. 11, 2004, the subject matter of which is incorporated herein by reference.

BACKGROUND OF THE INVENTION

1. Field of the Invention

The invention relates in general to an apparatus and a method for an optical drive, and more particularly to an apparatus and a method of ejecting an optical disc for an optical drive.

2. Description of the Related Art

Along with the rapid and booming development in multimedia industry in recent years, the small-sized compact disc which has a large capacity and can store data for long has gained a wide popularity and the optical drive with disc access function plays an important role in the market of multi-media products.

Most conventional optical drives at least include a tray and a tray motor. The tray is for carrying the disc, while the tray motor is for driving the tray to be moved into or out the optical drive for the disc to be loaded into or unloaded from the disc driver.

Normally, when the user presses a button on the panel for loading or unloaded a disc, the controlling unit of the optical drive will provide a pre-set constant voltage to the tray motor to drive out the tray from the optical drive so that the user can load/unload the disc. The pre-set constant voltage is set so as to achieve stability and precision when the tray is driven out from the optical drive. That is to say, the manufacturer expects that with the pre-set constant voltage, the tray motor can drive out the tray from optical drive smoothly and precisely.

However, the conventional method of using a pre-set constant voltage to move out the tray from the optical drive cannot assure the stability and precision when the tray is being removed. As a result, malfunctions always occur when the optical drive is in use. For example, if the value of the pre-set constant voltage is larger than what is actually needed, in other words, the margin of combination of mechanic elements of the optical drive is large, the tray motor will drive out the tray from the optical drive faster, the occurrences of mechanic collision between the tray and the optical drive are more likely to occur. Consequently, the lifespan of the optical drive will be largely shortened. Worse than that, if the tray is driven out from the optical drive at too fast a speed that cannot be reduced in time, the disc might even be separated from the tray especially when a vertical-type optical drive is used. If this should happen, the damage might be irreversible. Besides, when the pre-set constant voltage is smaller than what is actually needed, the tray motor will be unable to drive the tray to a pre-set position, causing a big inconvenience to the user.

It can be seen from the above disclosure that when ejecting a disc from an optical drive, the tray cannot be smoothly and precisely driven out from the optical drive by way of providing a pre-set constant voltage to the tray motor for driving the tray. Therefore, how to smoothly and precisely control the tray from the optical drive has become an object to be achieved to relevant professionals.

SUMMARY OF THE INVENTION

It is therefore an object of the invention to provide an apparatus and a method of ejecting an optical disc for an optical drive, enabling the tray to be driven out from the optical drive smoothly and precisely by adjusting the voltage provided to the tray motor.

According to the object of the invention, a method of ejecting an optical disc for an optical drive using a tray motor to drive out a tray carrying a disc is provided. The method includes the following steps. First of all, a first voltage to the tray motor for driving out the tray positioned at a first position inside an optical drive is provided. Next, a time required for moving the tray from the first position to a second position is measured, wherein the second position is positioned between the first position and a complete-ejection position. After that, a second voltage according to the time is determined. Lastly, the second voltage to the tray motor for moving the tray to the complete-ejection is provided.

According to the object of the invention, an apparatus of ejecting an optical disc for an optical drive applied in the optical drive using a tray motor to drive out a tray carrying a disc is provided. The device includes a driving unit, a measuring unit, and a controlling unit. The driving unit provides a first voltage to the tray motor for driving and moving the tray positioned at a first position inside the optical drive to a second position. The measuring unit measures a time required for moving the tray from a first position to a second position, wherein the second position is positioned between the first position and a complete-ejection position. The controlling unit determines a second voltage according to the time. After having determined the second voltage, the driving unit provides the second voltage to the tray motor for driving and moving the tray to the complete-ejection position.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention utilizes the physic characteristics that motor rotates at different rotation rates according to the voltage received, so that the tray driven by a tray motor can move the tray more smoothly and precisely.

The tray ejection of an optical drive is to drive the tray to move from a first position R1 inside the optical drive to a complete-ejection position R3 outside the optical drive. The first position R1 of the present invention means that the tray is located at a tray stop position inside the optical drive and the disc can be normally assessed. When the tray is positioned at the complete-ejection position R3, the user can load/unload the disc.

Figure 1:
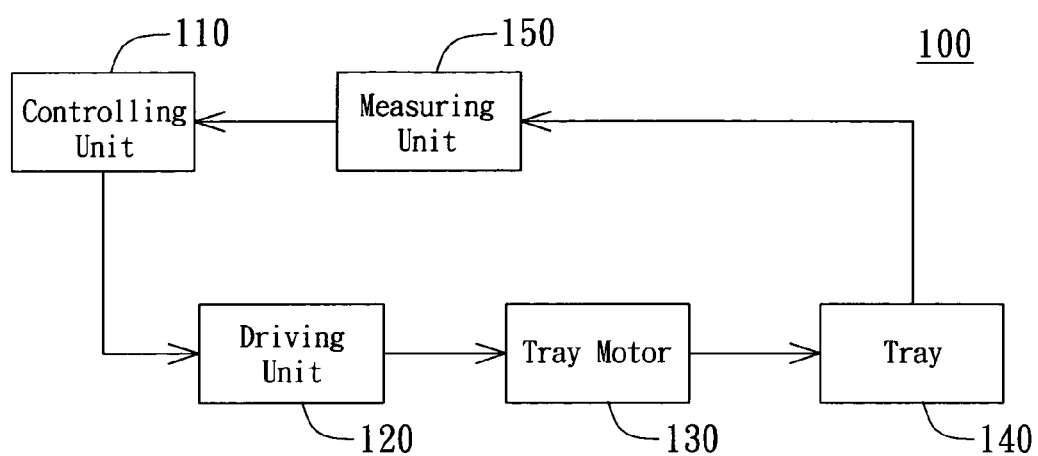
FIG. 1 is a block diagram of a tray-ejecting device according to a preferred embodiment of the invention.

Referring to FIG. 1, a block diagram of a tray-ejecting device according to a preferred embodiment of the invention is shown. In the preferred embodiment, the tray-ejecting device 100 applied in an optical drive uses a tray motor to drive out the tray carrying a disc. The tray-ejecting device 100 includes a controlling unit 110, a driving unit 120, a tray motor 130, a tray 140, and a measuring unit 150. When a disc is driven out from the optical drive, the driving unit 120 of the tray-ejecting device 100 uses a pre-set first voltage V1 to drive the tray motor 130, so that the tray motor 130 can drive out the tray 140.

The driving unit 120 according to the preferred embodiment differs with a conventional tray-ejecting device in that the pre-set first voltage V1 is not always provided to the tray motor 130 by the driving unit 120 during tray ejection. According to the measured time provided by the measuring unit 150, the controlling unit 110 determines a second voltage V2 to the driving unit 120. That is to say, after the controlling unit 110 has determined the second voltage V2, the driving unit 120 uses the second voltage V2 to drive the tray motor 130, so that the tray 140 can be smoothly ejected.

Figure 2:
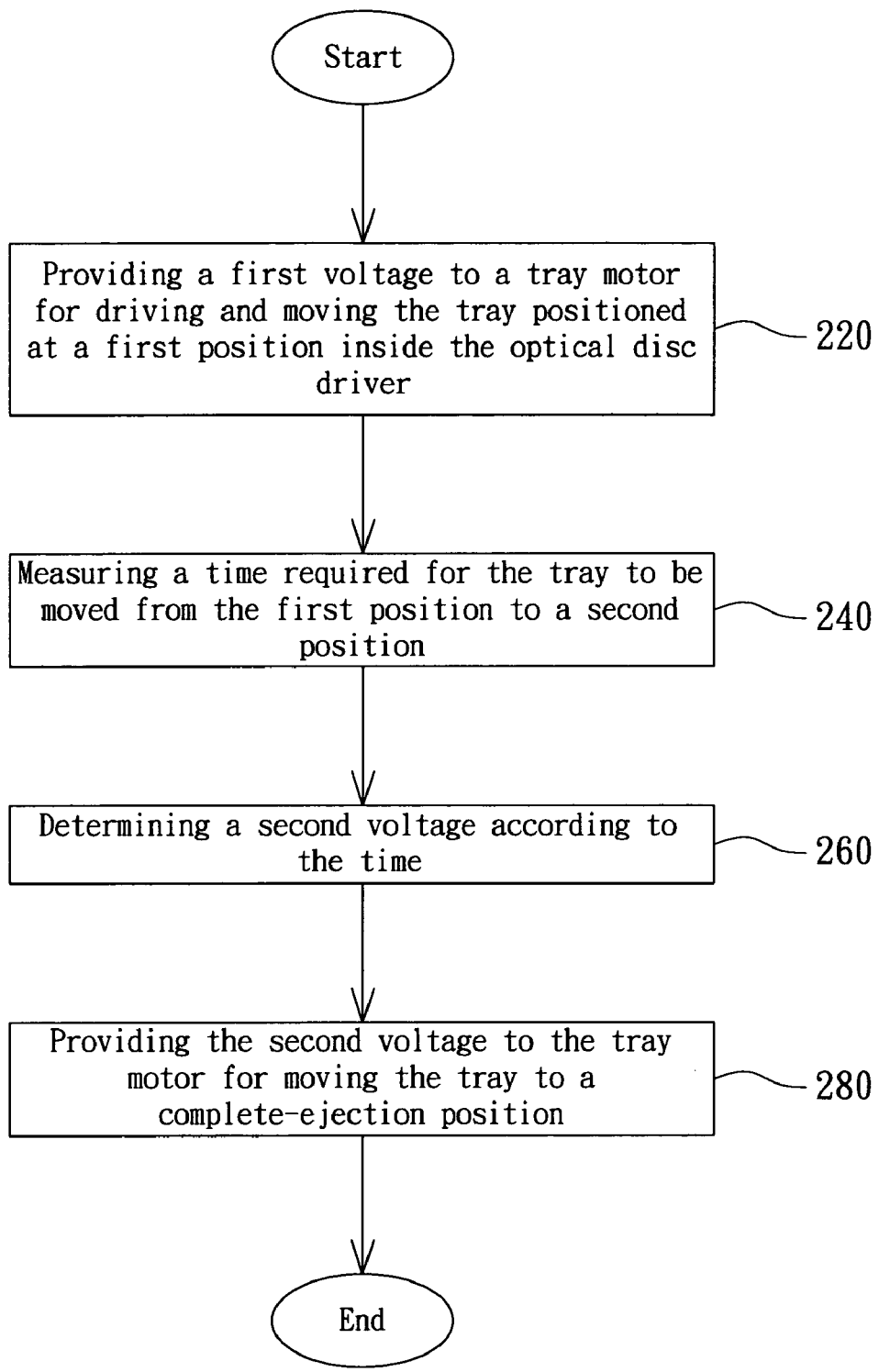
FIG. 2 is a flowchart of a tray-ejecting device according to a preferred embodiment of the invention.

Refer to both FIG. 1 and FIG. 2. FIG. 2 is a flowchart of a tray-ejecting device according to a preferred embodiment of the invention. The method is applied in an optical drive. First of all, the method begins in step 220: the driving unit 120 of the tray-ejecting device 100 provides a first voltage V1 to the tray motor 130 for driving and moving the tray 140 positioned at the first position R1 inside the optical drive.

Next, proceed to step 240: the measuring unit 150 measures a time TI, the time required for the tray 140 to be moved from the first position R1 to the second position R2. It is noteworthy that, the second position R2 according to the preferred embodiment is positioned between the first position R1 and the complete-ejection position R3, wherein the second position R2 is normally positioned around the complete-ejection position R3.

After that, proceed to step 260: the controlling unit 110 determines the second voltage V2 according to the time TI measured by the measuring unit 150. Lastly, proceed to step 280: the driving unit 120 provides the second voltage V2 to the tray motor 130 for driving and moving the tray 140 to the complete-ejection position R3 to complete the tray ejection of the optical drive.

First of all, when the optical drive is to drive out a disc, the driving unit 120 of the disc-ejecting device 100 provides a first voltage V1 to the tray motor 130 for driving and moving the tray 140 from the first position R1 to the second position R2. Next, the driving unit 120 provides a second voltage V2 to the tray motor 130 for driving and moving the tray 140 continually to the complete-ejection position R3 to complete tray ejection.

The first voltage V1 is the pre-set voltage, while the second voltage V2 is determined by the controlling unit 110 according to the time of moving the tray 140 from the first position R1 to the second position R2. That is to say, the method of the optical drive according to the preferred embodiment enables the tray 140 to be smoothly ejected from the optical drive by appropriately adjusting the voltage provided to the tray motor 120 by the measuring unit 150 and controlling unit 110 of the tray-ejecting device 100.

The details below disclose how the controlling unit 110 of the tray-ejecting device 100 determines the value of the second voltage V2 according to the time T1.

Before the optical drive leaves the factory, the measuring unit 150 of the tray-ejecting device 100 can be arranged to measure the time required for the tray 140 to be moved from the first position R1 to the second position R2 and record an expected time TA. It is preferred that an appropriate tolerance P is included in the expected time TA and that the obtained result TP1 (TP1=TA−P) & TP2(TP2=TA+P) is pre-stored in the controlling unit 110.

The abovementioned TP1 is the first pre-set time, and TP2 is the second pre-set time. Ideally, the time TI measured by the measuring unit 150 will be between the first pre-set time TP1 and the second pre-set time TP2 when the optical drive ejects a tray.

Figure 3A:
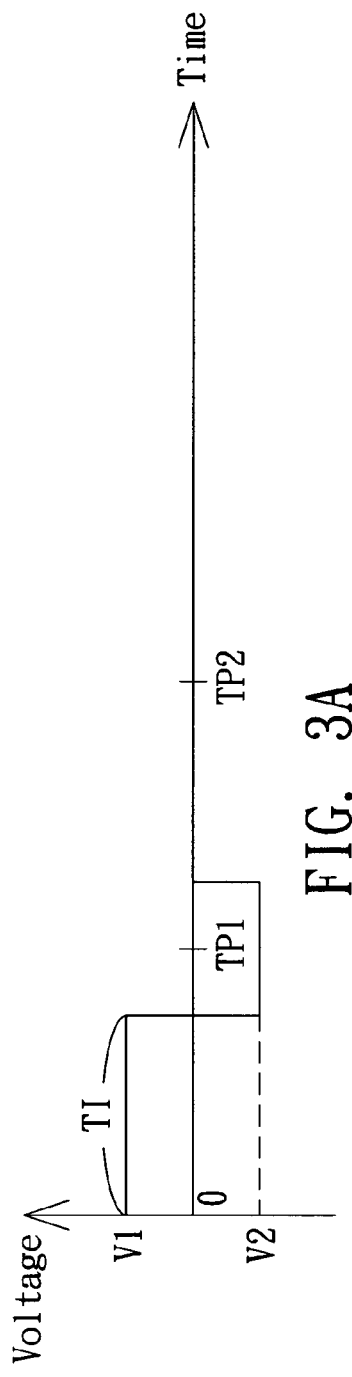
FIGS. 3A~3C are schematic diagrams of providing a voltage to a driving unit according to a preferred embodiment of the invention.
Figure 3B:
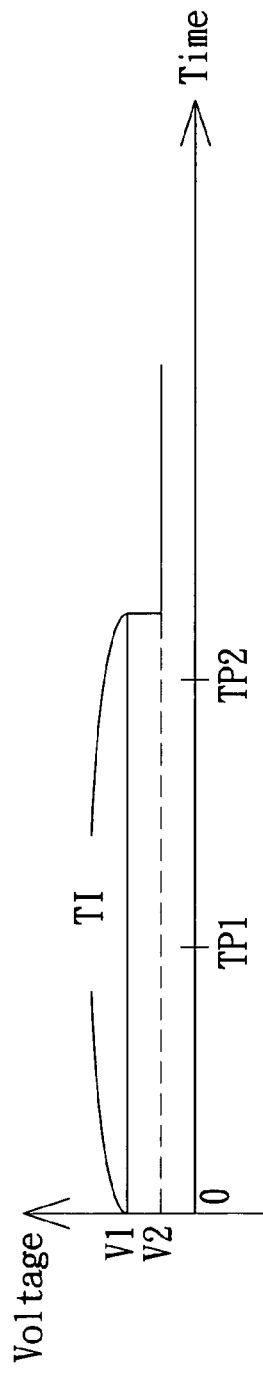
Figure 3C:
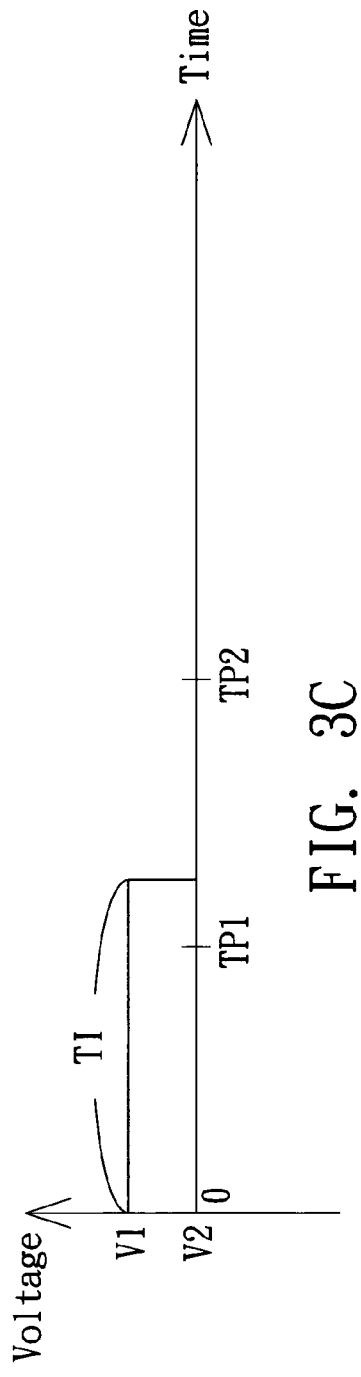

Refer to FIG. 2 and FIGS. 3A~3C again. FIGS. 3A~3C are schematic diagrams of providing a voltage to a driving unit according to a preferred embodiment of the invention are shown. In the step 260 of determining the second voltage, when the time TI measured by the measuring unit 150 is smaller than the first pre-set time TP1, the value of the second voltage V2 determined by the controlling unit 110 is smaller than the first voltage V1 as shown in FIG. 3A.

When the time TI is smaller than the first pre-set time TP1, it means the actual time required for the tray 140 to be moved from the first position R1 to the second position R2 is shorter than what would normally be required. That is, the tray 140 is moved from the first position R1 to the second position R2 at a speed faster than a normal ejecting speed. During the following process of ejecting a tray, the driving unit 120 has to provide a second voltage V2 smaller than the first voltage V1 to the tray motor 130 for braking, wherein the polarity of the second voltage V2 is preferably opposite to that of the first voltage V1 to form a braking mechanism for the tray 140 driven by tray motor 130. By doing so, the collision and vibration among mechanic elements of the optical drive caused when the tray 140 is ejected at too fast a speed can be prevented. More importantly, the disc carried on the tray 140 will not be separated from the tray 140 during disc ejection.

Besides, when the time TI measured by the measuring unit 150 is larger than the second pre-set time TP2, the value of the second voltage V2 determined by the controlling unit 110 is smaller than the first voltage V1 as shown in FIG. 3B.

When the time TI is larger than the second pre-set time TP2, it means the actual time required for the tray 140 to be moved from the first position R1 to the second position R2 is longer than what would normally be required. That is, the tray 140 is moved from the first position R1 to the second position R2 at a speed slower than a normal ejecting speed. During the following process of ejecting a tray, the driving unit 120 still needs to continually provide a voltage to the tray motor 130 for the tray 140 driven by the tray motor 130 to be moved to the complete-ejection position R3 precisely.

Moreover, when the time TI measured by the measuring unit 150 is between the first pre-set time TP1 and the second pre-set time TP2, the value of the second voltage V2 determined by the controlling unit 110 is substantially equal to 0 as shown in FIG. 3C.

When the time TI is between the first pre-set time TP1 and the second pre-set time TP2, it means the actual time required for the tray 140 to be moved from the first position R1 to the second position R2 is the same with what would normally be required. That is, the tray 140 is moved from the first position R1 to the second position R2 at a normal ejecting speed. During the following process of ejecting a tray, the driving unit 120 does not need to continually provide a voltage to the tray motor 130 for the tray 140 driven by the tray motor 130. The tray 140 can be moved to the complete-ejection position R3 smoothly by means of a momentum.

The apparatus and method for ejecting an optical disc for an optical drive disclosed in the above preferred embodiments according to the invention prevents malfunction of the tray when the optical drive ejects a disc.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of ejecting an optical disc for an optical drive for using a tray motor to drive out a tray carrying a disc, wherein the method comprises:
   providing a first voltage to the tray motor for moving the tray positioned at a first position inside the optical drive;
   measuring a time required for moving the tray from the first position to a second position, wherein the second position is positioned between the first position and a complete-ejection position;
   determining a second voltage which is smaller than the first voltage when the time is smaller than a first pre-set time; and
   providing the second voltage to the tray motor for moving the tray to the complete-ejection position.

2. The method according to claim 1, wherein a polarity of the second voltage is opposite to a polarity of the first voltage.

3. A method of ejecting an optical disc for an optical drive for using a tray motor to drive out a tray carrying a disc, wherein the method comprises:
   providing a first voltage to the tray motor for moving the tray positioned at a first position inside the optical drive;
   measuring a time required for moving the tray from the first position to a second position, wherein the second position is positioned between the first position and a complete-ejection position;
   determining a second voltage which is smaller than the first voltage when the time is larger than a second pre-set time; and
   providing the second voltage to the tray motor for moving the tray to the complete-ejection position.

4. A method of ejecting an optical disc for an optical drive for using a tray motor to drive out a tray carrying a disc, wherein the method comprises:
   providing a first voltage to the tray motor for moving the tray positioned at a first position inside the optical drive;
   measuring a time required for moving the tray from the first position to a second position, wherein the second position is positioned between the first position and a complete-ejection position;
   determining a second voltage which is substantially equal to 0 when the time is between a first pre-set time and a second pre-set time, while the first pre-set time is smaller than the second pre-set; and
   providing the second voltage to the tray motor for moving the tray to the complete-ejection position.

5. An apparatus of ejecting an optical disc for an optical drive applied in an optical drive for using a tray motor to move a tray carrying a disc, wherein the tray-ejecting device comprises:
   a driving unit for providing a first voltage to the tray motor for moving the tray positioned at a first position inside the optical drive to a second position;
   a measuring unit for measuring a time required for the tray to be moved from the first position to the second position, wherein the second position is positioned between the first position and a complete-ejection position; and
   a controlling unit for determining a second voltage which is smaller than the first voltage when the time is smaller than a first pre-set time;
   wherein, after the controlling unit has determined the second voltage, the driving unit provides the second voltage to the tray motor for driving and moving the tray to the complete-ejection position.

6. The apparatus according to claim 5, wherein a polarity of the second voltage is opposite to a polarity of the first voltage.

7. An apparatus of ejecting an optical disc for an optical drive applied in an optical drive for using a tray motor to move a tray carrying a disc, wherein the tray-ejecting device comprises:
   a driving unit for providing a first voltage to the tray motor for moving the tray positioned at a first position inside the optical drive to a second position;
   a measuring unit for measuring a time reguired for the tray to be moved from the first position to the second position, wherein the second position is positioned between the first position and a complete-ejection position; and
   a controlling unit for determining a second voltage which is smaller than the first voltage when the time is larger than a second pre-set time;
   wherein, after the controlling unit has determined the second voltage, the driving unit provides the second voltage to the tray motor for driving and moving the tray to the complete-ejection position.

8. An apparatus of ejecting an optical disc for an optical drive applied in an optical drive for using a tray motor to move a tray carrying a disc, wherein the tray-ejecting device comprises:
   a driving unit for providing a first voltage to the tray motor for moving the tray positioned at a first position inside the optical drive to a second position;
   a measuring unit for measuring a time reguired for the tray to be moved from the first position to the second position, wherein the second position is positioned between the first position and a complete-ejection position; and
   a controlling unit for determining a second voltage which is substantially equal to 0 when the time is between a first pre-set time and a second pre-set time, while the first pre-set time is smaller than the second pre-set time;
   wherein, after the controlling unit has determined the second voltage, the driving unit provides the second voltage to the tray motor for driving and moving the tray to the complete-ejection position.

* * * * *